United States Patent
Choi et al.

(10) Patent No.: US 12,069,020 B2
(45) Date of Patent: Aug. 20, 2024

(54) APPARATUS AND METHOD FOR MANAGING GROUP MENTION BASED ON USER BEHAVIOR CONDITIONS BY MENTION TYPE

(71) Applicants: Delta PDS CO., LTD., Seoul (KR); Jae Ho Choi, Seoul (KR); Seo Hyun Choi, Seoul (KR)

(72) Inventors: Jae Ho Choi, Seoul (KR); Seo Hyun Choi, Seoul (KR)

(73) Assignees: DELTA PDS CO., LTD., Seoul (KR); Jae Ho Choi, Seoul (KR); Seo Hyun Choi, Seoul (KR)

( * ) Notice: Subject to any disclaimer, the term of this patent is extended or adjusted under 35 U.S.C. 154(b) by 0 days.

(21) Appl. No.: 18/117,750

(22) Filed: Mar. 6, 2023

(65) Prior Publication Data

US 2023/0283583 A1    Sep. 7, 2023

(30) Foreign Application Priority Data

Mar. 4, 2022 (KR) .......................... 10-2022-0028116

(51) Int. Cl.
*H04L 51/216* (2022.01)
*H04L 51/214* (2022.01)
*H04L 67/50* (2022.01)

(52) U.S. Cl.
CPC .......... *H04L 51/216* (2022.05); *H04L 51/214* (2022.05); *H04L 67/535* (2022.05)

(58) Field of Classification Search
CPC ... H04L 51/216; H04L 51/214; H04L 51/066; H04L 51/42; H04L 67/535
See application file for complete search history.

(56) References Cited

U.S. PATENT DOCUMENTS

| | | | | |
|---|---|---|---|---|
| 2009/0327972 A1* | 12/2009 | McCann | ............... | G06F 3/0482 707/E17.108 |
| 2016/0330160 A1* | 11/2016 | Shan | ..................... | H04L 51/214 |
| 2019/0149651 A1* | 5/2019 | Tokuchi | ........... | H04M 1/72436 455/466 |
| 2019/0200177 A1* | 6/2019 | Greene | .................. | G06Q 10/06 |

(Continued)

FOREIGN PATENT DOCUMENTS

KR    10-2021-0010219 A    1/2021

*Primary Examiner* — Jungwon Chang
(74) *Attorney, Agent, or Firm* — Paratus Law Group, PLLC

(57) ABSTRACT

There is provided an apparatus for managing a group mention based on a user behavior condition by mention type. The apparatus includes: a user-designated mention reception portion that receives a user-designated mention including a user-designated identifier and user-designated information about one or more users forming a user group; an unread count calculation portion that identifies the user-designated identifier, distinguishes the mention type of the user-designated mention, and calculates an unread count of the user-designated mention that has not yet been read by a corresponding user based on the user-designated information; and an unread count processing portion that determines the user behavior condition for subtracting the unread count according to the mention type and determines whether to subtract the unread count by detecting a user behavior associated with the user-designated mention.

11 Claims, 10 Drawing Sheets

(56) References Cited

U.S. PATENT DOCUMENTS

| | | | |
|---|---|---|---|
| 2019/0364118 A1* | 11/2019 | Camera | H04L 67/535 |
| 2020/0396191 A1* | 12/2020 | Yang | H04L 51/42 |
| 2021/0021556 A1* | 1/2021 | Choi | H04L 51/066 |
| 2022/0147941 A1* | 5/2022 | Choi | G06Q 10/103 |

* cited by examiner

FIG.6

| User-designated information | | Mention classification result |
|---|---|---|
| User A = 'User A' | ⇨ | 'User-designated mention' |
| User B ≠ 'User A' | ⇨ | 'User-undesignated mention' |
| User C ≠ 'User A' | ⇨ | 'User-undesignated mention' |
| ⋮ ⋮ | | ⋮ |

APPARATUS AND METHOD FOR MANAGING GROUP MENTION BASED ON USER BEHAVIOR CONDITIONS BY MENTION TYPE

CROSS REFERENCE TO PRIOR APPLICATIONS

This application claims priority from and the benefit of Korean Patent Application Nos. 10-2022-0028116 filed on Mar. 4, 2022 and 10-2022-0128646 filed on Oct. 7, 2022, which are all hereby incorporated by reference in their entirety.

BACKGROUND

The present disclosure relates to a technology for managing a user mention within a group, and more particularly, to a technology for effectively supporting work execution by smoothly sharing mentions among work participants participating in a joint project or work.

Conventionally, in order to improve work efficiency through multilateral communication, various methods of sharing messages or mentions of users have been provided. Further, various interfaces such as a web page, a shared folder system, a chat room, and a cloud may be used to share such messages, mentions, or comments.

For example, an Internet messenger may be implemented as a chat room that corresponds to an application for sharing messages or mentions including texts or graphics between users and participates by multiple users. Recently, as the size of the project increases, such Internet messengers are gradually being used in various ways in the management and progress of the work.

However, in the related art, when providing mentions, it is difficult to specify users who need to check the corresponding mentions, and it is difficult to distinguish the number of accumulated mentions for each user and the importance and severity of the mentions.

RELATED ART DOCUMENT

Patent Document (Patent document 0001) Korean Patent Application Publication No. 10-2021-0010219, Jan. 27, 2021

SUMMARY

An embodiment of the present disclosure provides an apparatus and method for managing a group mention based on a user behavior condition by mention type that manages a number of unread mentions by specifying a corresponding user behavior according to the type of mention as a condition when a specific user is specified as a target of the mention in the course of communication among multiple users.

In an embodiment, the apparatus for managing a group mention based on a user behavior condition by mention type includes: a user-designated mention reception portion that receives a user-designated mention including a user-designated identifier and user-designated information about one or more users forming a user group; an unread count calculation portion that identifies the user-designated identifier, distinguishes the mention type of the user-designated mention, and calculates an unread count of the user-designated mention that has not yet been read by a corresponding user based on the user-designated information; and an unread count processing portion that determines the user behavior condition for subtracting the unread count according to the mention type and determines whether to subtract the unread count by detecting a user behavior associated with the user-designated mention.

The unread count calculation portion may determine, when the user-designated mention is input, the user-designated information by identifying the user-designated identifier, and determine a designated target user of the user-designated mention by comparing the user-designated information with pre-stored user information.

The unread count calculation portion may determine the mention type of the user-designated mention based on the number of repetitions of a unit-designated command configuring the user-designated identifier.

The unread count processing portion may maintain the unread count for the corresponding user when failing to detect the user behavior that satisfies the user behavior condition for a predetermined time period based on an input time of the user-designated mention.

The unread count processing portion may include a behavior of inputting a response message by the corresponding user in a chat room as the user behavior condition when the user-designated mention is input as a conversation message in the chat room in which the one or more users included in the user group participate.

The unread count processing portion may include a specific behavior required by a system message in the user behavior condition when the user-designated identifier is used for the system message associated with the user group.

The unread count processing portion may include each of a behavior of creating a note chat room associated with a work note and a behavior of inputting a response message in the note chat room in the user behavior condition when the user-designated identifier is used for the work note associated with the user group.

The unread count processing portion may independently assign the user behavior condition according to the mention type for each strategy map associated with the user group.

The apparatus for managing a group mention may further include a mention reminder management portion that creates a reminder message according to a preset reminder cycle for the user-designated mention that has not yet been read by the corresponding user, and transmits the message to the corresponding user.

The mention reminder management portion may provide the reminder message to the corresponding user when failing to detect the user behavior that satisfies the user behavior condition even when the corresponding user has read the user-designated mention according to the mention type.

Among embodiments, a method for managing a group mention based on a user behavior condition by mention type includes: receiving, by a user-designated mention reception portion, a user-designated mention including a user-designated identifier and user-designated information about one or more users forming a user group; identifying the user-designated identifier, distinguishing the mention type of the user-designated mention, and calculating an unread count of the user-designated mention that has not yet been read by a corresponding user based on the user-designated information by an unread count calculation portion; and determining, by an unread count processing portion, the user behavior condition for subtracting the unread count according to the mention type and determining whether to subtract the unread count by detecting a user behavior associated with the user-designated mention.

The disclosed technology can have the following benefits. However, since a specific embodiment is not construed as including all of the following benefits or only the following benefits, it should not be understood that the scope of right of the disclosed technology is limited to the specific embodiment.

According to an embodiment of the present disclosure, in the process of sharing mentions that specify a user, it is possible to classify the mentions that the designated person needs to check or give feedback by type, and manage the same separately according to the priority or severity of the work. In addition, by distinguishing user behavior conditions by mention type and counting the unread count for mentions in an unconfirmed state, it is possible to provide convenience to work-related persons in grasping the work status.

BRIEF DESCRIPTION OF THE DRAWINGS

FIGS. 5 and 6 are diagrams illustrating an embodiment of a management process of a group mention according to an embodiment of the present disclosure.

DETAILED DESCRIPTION

Figure 1:
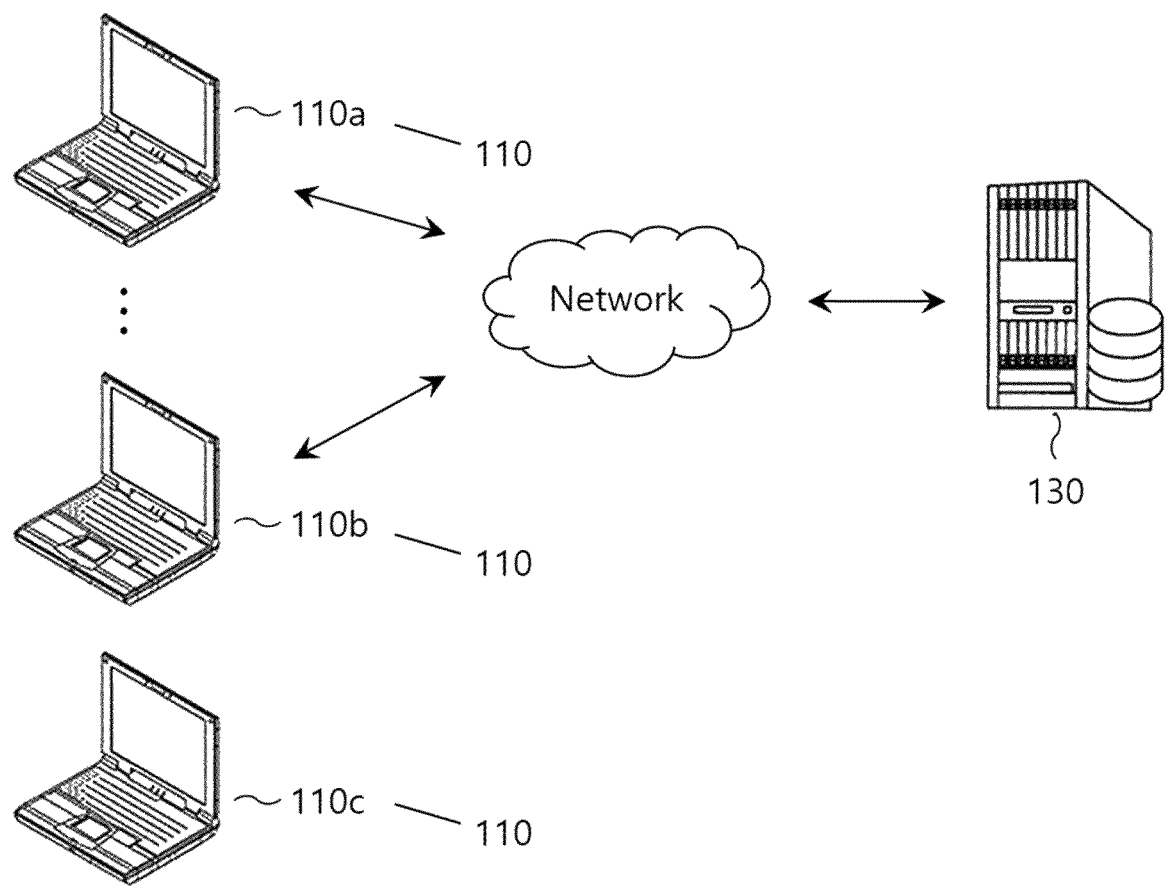
FIG. 1 is a diagram illustrating a system for managing a group mention according to an embodiment of the present disclosure.

Since the description of the present disclosure is merely an embodiment for structural or functional explanation, the scope of the present disclosure should not be construed as being limited by the embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Meanwhile, other expressions describing a relationship between components, that is, "between," "directly between," "neighboring to," "directly neighboring to," and the like, should be similarly interpreted.

It should be understood that the singular expression includes the plural expression unless the context clearly indicates otherwise, and it will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Identification symbols (for example, a, b, and c) for individual steps are used for the convenience of description. The identification symbols are not intended to describe an operation order of the steps. Therefore, unless otherwise explicitly indicated in the context of the description, the steps may be executed differently from the stated order. In other words, the respective steps may be performed in the same order as stated in the description, actually performed simultaneously, or performed in reverse order.

The present disclosure may be implemented in the form of program code in a computer-readable recording medium. A computer-readable recording medium includes all kinds of recording devices storing data that a computer system may read. Examples of a computer-readable recording medium include a ROM, a RAM, a CD-ROM, a magnetic tape, a floppy disk, and an optical data storage device. Also, the computer-readable recording medium may be distributed over computer systems connected through a network so that computer-readable code may be stored and executed in a distributed manner.

Unless defined otherwise, all the terms used in the present disclosure provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

FIG. 1 is a diagram illustrating a system for managing a group mention according to an embodiment of the present disclosure.

Referring to FIG. 1, a system 100 for managing a group mention may include a plurality of user terminals 110 and an apparatus 100 for managing a group mention.

The user terminal 110 may correspond to a computing apparatus operated by a user. For example, the user terminal 110 may be implemented as a desktop, a laptop, a tablet PC or a smartphone, but is not necessarily limited thereto and may be implemented as various devices.

There may be one or more user terminals 110, and in this connection, it may be any one of or one or more of a first user terminal 110a, a second user terminal 110b, and a third user terminal 110c. For convenience, the user terminal 110 used by a first user may be referred to as the first user terminal 110a, the user terminal 110 used by a second user may be referred to as the second user terminal 110b, and the user terminal 110 used by a third user may be referred to as the third user terminal 110c.

In an embodiment of the present disclosure, a plurality of users may be included in one or more user groups. One or more user groups may be referred to as a first user group, a second user group, and a third user group. One user may be simultaneously included in one or more user groups.

In addition, a plurality of users may participate in a joint project or work. In this connection, one entire project may exist, and the entire project may include a plurality of work projects that proceed independently. In addition, work notes according to work progress stages associated with each work project may be created and stored, and various work histories (or work records) related to the work may be recorded in the work notes. In other words, the work note may correspond to an object or file that stores work records.

In addition, various work objects associated with each work project may be created and stored, and records regarding the start, progress, and completion of individual piece of work may be stored in the work object. Users participating in the entire project may correspond to work participants, and the work participants may be connected in units of work projects to mutually share project-related data and perform work-related communication. In addition, the work participants may utilize various channels such as chat rooms, messages, and SNS for mutual communication.

In addition, various pieces of work carried out within the entire project or individual work projects may be managed through work processing flows, and each piece of work may be managed through work units. Herein, the work processing flow may be defined as a work processing flow between work units of different types. In other words, a work unit is a unit object for work management, and may be created and processed in response to various pieces of work occurring in the course of a project, and may correspond to a work note or a work object.

In particular, mutually subordinate connection relationships may be formed among a plurality of different types of work units. When the work unit of a first type configuring the work processing flow is created, the work unit of a second type may be created through the work unit of the first type, and the work unit of the second type may be subordinated to the work unit of the first type. For example, a work note may be created in the process of a work project, and a work object may be created in association with the work note. In this connection, the work object may be managed in subordinate to the corresponding work note.

In an embodiment, at least one of the user terminals 110 may be a mobile terminal and may be connected to an apparatus 130 for managing a group mention through cellular communication or Wi-Fi communication. In another embodiment, at least one of the user terminals 110 may be a desktop and may be connected to the apparatus 130 for managing a group mention through the Internet.

The apparatus 130 for managing a group mention may correspond to a computing device capable of being connected with at least one user terminal 110 via a network. In an embodiment, the apparatus 130 for managing a group mention may manage at least one user group in which other users associated with one user are included as members, that is, work participants.

In an embodiment, the apparatus 130 for managing a group mention may be connected to the user terminal 110 through a dedicated agent installed in the user terminal 110. Herein, the dedicated agent may correspond to an agent program that is software that, when installed in the user terminal 110, allows the user terminal 110 and the apparatus 130 for managing a group mention to interwork with each other under the approval of the user terminal 110.

The connection and coupling between the apparatus 130 for managing a group mention and the user terminal 110 described herein may correspond to one embodiment, and may be changed and applied in various forms within the ordinary scope according to various operating environments.

Figure 2:
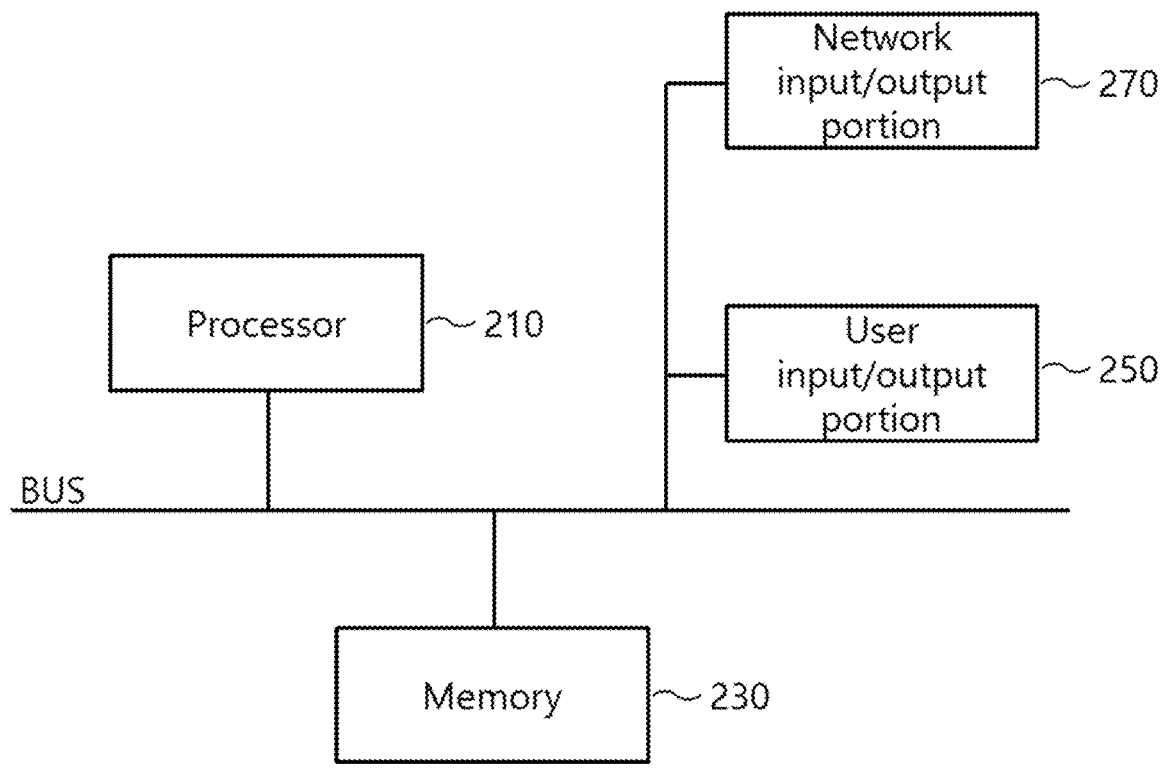
FIG. 2 is a diagram illustrating a system configuration of an apparatus for managing a group mention of FIG. 1.

FIG. 2 is a diagram illustrating a system configuration of an apparatus for managing a group mention of FIG. 1.

Referring to FIG. 2, the apparatus 130 for managing a group mention may include a processor 210, a memory 230, a user input/output portion 250, and a network input/output portion 270.

The processor 210 may execute a group mention management procedure based on a user behavior condition by mention type according to an embodiment of the present disclosure, manage the memory 230 read or written in this process, and schedule a synchronization time between a volatile memory and a non-volatile memory in the memory 230.

The processor 210 may control overall operations of the apparatus 130 for managing a group mention, and may be electrically connected to the memory 230, the user input/output portion 250, and the network input/output portion 270 to control data flow therebetween. The processor 210 may be implemented as a CPU (Central Processing Unit) or a GPU (Graphics Processing Unit) of the apparatus 130 for managing a group mention. More detailed operation of the processor 210 will be described in detail with reference to FIG. 3 hereinafter.

The memory 230 may be implemented in the form of a non-volatile memory such as a Solid State Disk (SSD) or a Hard Disk Drive (HDD). The memory 230 may include an auxiliary memory used to store overall data necessary for the apparatus 130 for managing a group mention and may include a main memory implemented in the form of a volatile memory, such as a Random Access Memory (RAM). As such, the memory 230 may be implemented in the form of a volatile memory and a non-volatile memory. When the memory 230 is implemented in the form of a non-volatile memory, the memory 230 may be connected via a hyperlink.

The user input/output portion 250 may include an environment for receiving a user input and an environment for outputting specific information to a user. For example, the user input/output portion 250 may include an input device including an adapter, such as a mouse, a trackball, a touch pad, a graphic tablet, a scanner, a touch screen, a keyboard, and a pointing device, and may include an output device including an adapter, such as a monitor and a touch screen. In an embodiment, the user input/output portion 250 may correspond to a computing device being accessed through a remote access, and, in this connection, the apparatus 130 for managing a group mention may serve as a server.

The network input/output portion 270 may include a communication environment for connecting the user terminal 110 via a network. For example, the network input/output portion 270 may include an adapter for communication such as LAN (Local Area Network), MAN (Metropolitan Area Network), WAN (Wide Area Network), and VAN (Value Added Network). In addition, the network input/output portion 270 may be implemented to provide a short-range communication function such as WiFi or Bluetooth or a 4G or higher wireless communication function for wireless transmission of data.

Figure 3:
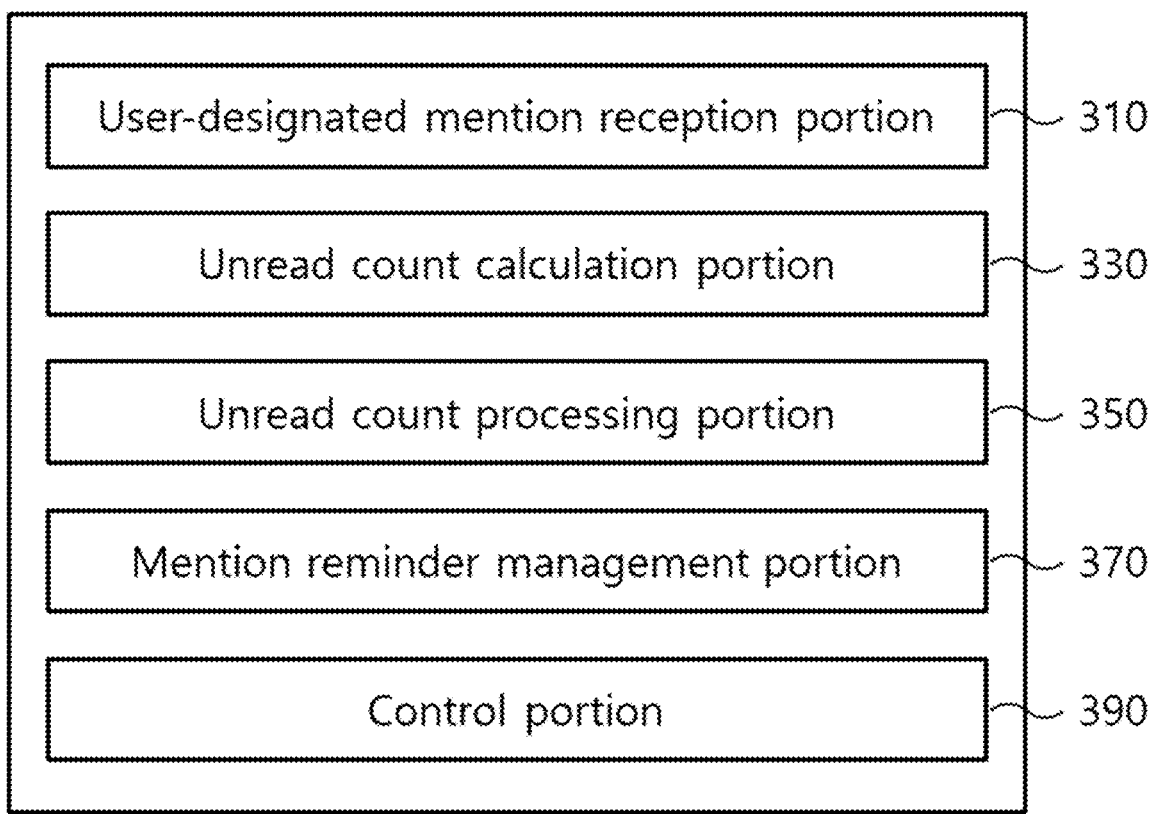
FIG. 3 is a diagram illustrating a functional configuration of the apparatus for managing a group mention of FIG. 1.

FIG. 3 is a diagram illustrating a functional configuration of the apparatus for managing a group mention of FIG. 1.

Referring to FIG. 3, the apparatus 130 for managing a group mention may include a user-designated mention reception portion 310, an unread count calculation portion 330, an unread count processing portion 350, a mention reminder management portion 370, and a control portion 390.

The user-designated mention reception portion 310 may receive a user-designated mention including a user-designated identifier and user-designated information about one or more users forming a user group. Herein, the user-designated mention may correspond to a message containing content to be delivered to a specific user, and a specific user designated by the message may correspond to one or more users included in a user group.

In addition, the user-designated mention reception portion 310 may receive user information about one or more users from the user terminal 110 to form a user group. Herein, the user group may be formed, managed, and/or stored by distinguishing the same into work project units. One or more users may be included in the user group, and one or more users may access the apparatus 130 for managing a group mention through each user terminal 110.

In addition, the user-designated mention reception portion 310 may provide the user terminal 110 with a dedicated interface for inputting user information. For example, when a dedicated agent for interworking with the apparatus 130 for managing a group mention is installed in the user terminal 110, the user-designated mention reception portion 310 may transmit a command for providing an interface to the dedicated agent. The user-designated mention reception portion 310 may receive user information input from the user terminal 110 and store the same in a database, and process user management operations in units of groups by adding the same to a previously created user group or forming a new user group.

In an embodiment, the user-designated mention reception portion 310 may provide user information if necessary in a process of inputting a user-designated mention. In this connection, the corresponding user information may include user group information. For example, a user may select a chat room, folder, note, message, or file related to the mention before inputting the user-designated mention. In this connection, the user-designated mention reception portion 310 may provide the user terminal 110 with user information associated with an object selected by the user.

The unread count calculation portion 330 may identify a user-designated identifier, distinguish a mention type of user-designated mention, and calculate an unread count of the user-designated mention that has not yet been read by the corresponding user based on user-designated information. Herein, the user-designated identifier may correspond to a symbol, character, or figure used to designate a user receiving a mention. For example, the user-designated identifier may correspond to '@', '#', etc., and may be placed at the beginning of a message. In addition, the user-designated information may correspond to unique identification information capable of uniquely identifying a user receiving a mention when used together with the user-designated identifier. For example, the user-designated information may correspond to a user's name, ID, user identification code, and the like.

In other words, the unread count calculation portion 330 may detect a user-designated identifier from the user-designated mention received through the user-designated mention reception portion 310, and extract user-designated information based on the user-designated identifier. In addition, the unread count calculation portion 330 may determine a mention type of user-designated mention through the user-designated identifier. In other words, the user-designated mention may be distinguished into the mention type based on user-designated identifier, and user behavior conditions for subtracting the unread count may be independently assigned according to the mention type.

In addition, when the user-designated mention is received, the unread count calculation portion 330 may cumulatively count the unread count of the user-designated mention based on whether the designated target user, that is, the user indicated by the user-designated information, reads. In other words, the unread count of mentions may be counted when the user who is the target of the mention does not check the corresponding mention after the mention is input. For example, for a user-designated mention designating user A, when user A does not check the corresponding mention, the unread count of the user-designated mention for user A may increase by 1. The unread count calculation portion 330 may calculate the unread count of mentions for each user or for each user group unit.

The unread count calculation portion 330 may calculate and store user-designated mentions and user-undesignated mentions separately. Herein, user-designated mentions and user-undesignated mentions may be basically classified based on whether these mentions are designated by a specific user. In other words, user-designated mentions and user-undesignated mentions may be classified based on the presence of user-designated information, but are not necessarily limited thereto. The unread count calculation portion 330 may store the mentions in a time series order, and may provide a list of mentions upon a user's request.

In an embodiment, the unread count calculation portion 330 may determine the user-designated information by identifying the user-designated identifier, and determine a designated target user of the user-designated mention by comparing the user-designated information with pre-stored user information when the user-designated mention is input. Specifically, the user-designated mention reception portion 310 may receive various mentions from the user terminal 110 and may select a mention including user-designated information from among the mentions. In this connection, the unread count calculation portion 330 may extract user-designated information from the user-designated mention, identify the user-designated information, and determine a designated target user corresponding to the user-designated mention.

For example, when a user-designated mention designating a second user who is a user of the second user terminal 110b is input from the first user terminal 110a, the unread count calculation portion 330 may identify a designated target user for the user-designated mention by comparing and matching the user-designated information included in the user-designated mention with pre-input user information. When the user-designated information of the user-designated mention received from the first user terminal 110a does not match user information in the previously input user group, the unread count calculation portion 330 may inform the first user terminal 110a that matching of user information has failed.

In this connection, the unread count calculation portion 330 may classify the corresponding mention as a user-undesignated mention rather than a user-designated mention. In other words, even when a mention includes user-designated information, the unread count calculation portion 330 may classify and process the user-designated information as the same as the mention that do not include user-designated information when the user corresponding to the user-designated information does not exist in a user group.

Even when user information is successfully matched, the unread count calculation portion 330 may classify each of the other users of the user group that do not correspond to the designated target user as a user-undesignated mention. For example, when three or more users are defined as being included in one user group, one user may input a user-designated mention targeting only some of the other users. In other words, assuming that a user group includes a first user, a second user, and a third user, the first user may input a user-designated mention A designating only the second user as a designated target user. In this connection, the user-designated mention A may be classified and counted as a user-designated mention for the second user.

However, the user-designated mention A may be recognized or classified as a user-undesignated mention to the third user who is another user of the corresponding user group. Accordingly, when the third user accesses the apparatus 130 for managing a group mention, the user-designated mention A may be included in a list of user-undesignated mentions and provided to the third user terminal 110c. In addition, from the perspective of the third user, the number of user-undesignated mentions and the unread count may each increase by one due to input of user-designated mention A by the first user.

In an embodiment, the unread count calculation portion 330 may determine the mention type of user-designated mention based on the number of repetitions of a unit-designated command configuring the user-designated identifier. Herein, the unit-designated command may correspond to a repeated symbol, character, or figure when a user-designated identifier used to designate a user is defined as repetition of the same symbol, character, or figure. For example, when the user-designated identifier is defined as '@@', the unit-designated command may correspond to '@.'

Accordingly, the unread count calculation portion 330 may determine the mention type based on the number of repetitions of the unit-designated command. For example, when the unit-designated command '@' is used as it is (or repeated once) together with user-designated information, the unread count calculation portion 330 may determine the corresponding mention as the first type. In addition, when the unit-designated command '@' is repeated two or more times and used together with user-designated information, the unread count calculation portion 330 may determine the corresponding mention as the second type. The unread count calculation portion 330 may define different mention types according to the number of repetitions of the unit-designated command as needed and utilize the same in the process of managing group mentions.

The unread count processing portion 350 may determine a user behavior condition for subtracting the unread count according to the mention type and determine whether to subtract the unread count by detecting a user behavior associated with the user-designated mention. For example, in the case of the first type of user-designated mention, a confirmation behavior of a user may be determined as a user behavior condition. Accordingly, when the user confirms the user-designated mention, the user behavior condition is satisfied, and the unread count of the user may be subtracted by 1. As another example, in the case of the second type of user-designated mention, the confirmation behavior of a user and the input behavior of a chat message may be determined as user behavior conditions. Accordingly, when the user inputs a chat message through a chat room after checking the user-designated mention, the user behavior condition is satisfied, and the unread count of the user may be subtracted by 1.

In other words, when the user behavior condition is determined for each user-designated mention, the unread count processing portion 350 may detect whether the user behavior satisfies the user behavior condition by monitoring the user behavior, and when the user behavior that satisfies the user behavior condition exists, the unread count may be decreased by 1 for the user. When a plurality of user behaviors are determined as the user behavior conditions and only some user behaviors are detected, the unread count processing portion 350 may determine that the user behavior condition is not satisfied and maintain the unread count for the user.

In an embodiment, the unread count processing portion 350 may maintain the unread count for the user when failing to detect a user behavior that satisfies the user behavior condition for a predetermined time period based on an input time point of the user-designated mention. The unread count processing portion 350 may basically determine the user behavior condition for the first type of mention as a reading behavior of a user. For example, when the reading behavior of the designated target user is detected within '10 minutes' from a time point when the user-designated mention A classified as the first type is input, the unread count processing portion 350 may subtract the unread count of the user-designated mention by 1. On the other hand, when the reading behavior of the designated target user is not detected until '10 minutes' elapses from a time point when the user-designated mention A is input, the unread count processing portion 350 may maintain the unread count of the user-designated mention.

The unread count processing portion 350 may set various combinations of user behaviors as user behavior conditions according to the characteristics of work associated with a mention, a time point and a location at which the mention is input, and the type of work-related persons and objects associated with the mention, and count and manage the unread count of the user-designated mention.

In an embodiment, when a user-designated mention is input as a chat message in a chat room in which one or more users included in a user group participate, the unread count processing portion 350 may include a behavior of inputting a response message by the corresponding user in the chat room in user behavior conditions. For example, in the case where the user-designated mention of the first type is input as a chat message through a chat room, such as ' @ Gil-dong Hong, please record a note,' when the designated target user 'Gil-dong Hong' opens the chat room and checks the message, the unread count of 'Gil-dong Hong' may be subtracted by 1. In this connection, the user behavior condition for subtracting the unread count may be set as a behavior of checking messages in the chat room. When the unread count becomes zero, an indication of the unread count may be removed.

In another embodiment, in the case where the user-designated mention of the second type is input through a chat room, such as '@@Gil-dong Hong, please record a note,' even when 'Gil-dong Hong' checks the message in the chat room, the unread count may be maintained. In this connection, the user behavior condition for subtracting the unread count may be set as a behavior of inputting a response message together with a behavior of checking the message in the chat room. When 'Gil-dong Hong' inputs a response message such as 'Yes, I will' through the corresponding chat room, the unread count of 'Gil-dong Hong' may be subtracted by 1.

In an embodiment, the unread count processing portion 350 may include a specific behavior required by a system message in the user behavior condition when the user-designated identifier is used for the system message associated with the user group. In other words, a user-designated identifier may be used for system messages as well as messages within a chat room, and the type of system message may be determined according to the user-designated identifier. In addition, like the user-designated mention, user behavior conditions for subtracting unread counts may be independently determined according to the type of system message.

For example, in the case where a system message of the first type such as '@ Gil-dong Hong, note-taking is due soon' is created, when the designated target user 'Gil-dong Hong' checks the system message, the unread count of 'Gil-dong Hong' may be subtracted by 1. In this connection, the user behavior condition for subtracting the unread count may be set as a behavior of checking the system message. When the unread count becomes zero, an indication of the unread count may be removed.

In another embodiment, in the case where a system message of the second type is created, such as '@@Gil-dong Hong, please write a note now,' even when 'Gil-dong Hong' checks the system message, the unread count may be maintained. In this connection, the user behavior condition for subtracting the unread count may be set as a behavior requested by the system message together with a behavior of checking the system message. When 'Gil-dong Hong' writes the note requested by the corresponding system message, the unread count of 'Gil-dong Hong' may be subtracted by 1.

The system message may correspond to a message automatically created by a system, not by a user. In addition, system messages may be classified into two types according to the purpose of message creation. Specifically, the first type of system message may correspond to a message type for providing specific state information to a user, and the second type of system message may correspond to a message type requesting a user to perform a specific behavior. Accordingly, the first type of system message may be created including only notification information about a specific state, whereas the second type of system message may be created including behavior information to be performed by the user and a deadline for performing the corresponding behavior.

For example, the system message may be created including an associated user behavior according to a work progress stage of a project or a work state of specific work. Specifically, in the case of work projects, operations related to writing, evaluation, or checking of work notes may be included in system messages. In the case of work objects, operations related to doing, completing, or checking may be included in system messages and requested as user behaviors.

In an embodiment, when the system message of the second type is created, the unread count processing portion 350 may add a link that provides direct access to an object associated with the system message according to the user behavior condition of the corresponding system message. For example, when a system message of the second type is created, such as '@@ Gil-dong Hong, please write a note now,' the unread count processing portion 350 may add a link that allows direct access to a plan requiring note writing in the corresponding system message. Accordingly, the designated target user 'Gil-dong Hong' may select a corresponding system message (for example, click or touch) to move to a plan requiring note writing.

In an embodiment, the unread count processing portion 350 may include each of a behavior of creating a note chat room associated with a work note and a behavior of inputting a response message in the note chat room in the user behavior condition when the user-designated identifier is used for the work note associated with the user group. Herein, the note chat room may correspond to a unique chat room related to the work note, and work-related persons associated with the work of the work note may participate. In this connection, the work-related person may include a work creator, a work instructor, a work manager, and the like.

In other words, the user-designated identifier may be used for messages as well as work notes, and the type of work note may be determined according to the user-designated identifier. In addition, like the user-designated mention, the user behavior conditions for subtracting the unread count may be independently determined according to the type of work note. For example, when the first type of the user-designated identifier such as '@' is used in a work note, the unread count of the designated target user may be subtracted by 1 when the designated target user checks the corresponding work note. In this connection, the user behavior condition for subtracting the unread count may be set as a behavior of checking the work note. When the unread count becomes 0, an indication of the unread count may be removed.

In another embodiment, when the second type of user-designated identifier such as '@@' is used in a work note, even when the designated target user checks the corresponding work note, the unread count unread may be maintained. In this connection, the user behavior condition for subtracting the unread count may be set as a behavior of creating a note chat room and a behavior of inputting a response message within the note chat room. When the designated target user creates a note chat room associated with the corresponding work note and then inputs a response message in the note chat room, the unread count may be subtracted by 1.

In an embodiment, the unread count processing portion 350 may independently assign the user behavior condition according to a mention type for each strategy map associated with a user group. Herein, the strategy map may correspond to a management tool for efficiently managing various pieces of work performed within a specific company according to work strategy and work organization, and may be structured and visualized through a strategy matrix. In this connection, the strategy matrix may correspond to a two-dimensional template structured with a correlation between work strategy and work organization. In other words, the strategy map may be expressed in the form of a two-dimensional matrix through the strategy matrix, and each plan created in relation to the work may be disposed and visualized on the strategy map. Depending on the work strategy and work organization, various types of strategy maps may be defined and used, and the configuration of the rows and columns of the strategy matrix may also vary depending on the type of strategy map. In an embodiment, the strategy map may be created and managed independently for each user group, and in this connection, the strategy map may structure and visualize various pieces of work performed within the user group.

Accordingly, the unread count processing portion 350 may independently assign the user behavior condition according to the mention type for each strategy map associated with a user group. For example, when a first strategy map is created for a first user group and a second strategy map is created for a second user group, the unread count processing portion 350 may equally assign user behavior conditions for all mention types to the first strategy map, and differently assign user behavior conditions according to each mention type to the second strategy map. Accordingly, in the case of a user-designated mention designating each user of the first user group, the unread count may be subtracted when each user checks the corresponding mention regardless of the mention type. In contrast, in the case of a user-designated mention designating each user of the second user group, independent user behavior conditions may be applied according to the mention type, and the determination of whether to subtract the unread count may be made on the premise that each user behavior condition is satisfied.

The mention reminder management portion 370 may create a reminder message according to a preset reminder cycle for the user-designated mention that has not yet been read by the corresponding user, and transmit the message to the corresponding user. Herein, the reminder message may correspond to a message for periodically providing a notification to a user so that the user may perform a specific behavior within a set period. Accordingly, the mention reminder management portion 370 may set whether the user reads as a reminder condition, determine that the reminder condition is satisfied when the user has not read for a preset time period, and create a reminder message for a user-designated mention that satisfies a reminder condition.

In this connection, the reminder cycle may correspond to a time period cycle for repeatedly creating a reminder message when a state is maintained even after the reminder message is created. The reminder cycle may be set in units of time, such as 1, 2, or 3 hours, or in units of days, such as 1, 3, or 5 days, or may be set in various units of time, depending on the characteristics of work.

In addition, the mention reminder management portion 370 may create a reminder message even in the case of a system message. In the case of a system message, a reminder message may be created according to the message type. For example, in the case of the second type of system message requesting a specific behavior of a user, when the user does not perform the specific behavior, a reminder message may be created according to a preset reminder cycle and delivered to the corresponding user.

In the case of the first type of system message, the unread count is automatically subtracted when a set time period elapses after a user confirmation, so a reminder message may not be created. However, the number of repetitions of the first type of system message may be separately set. In other words, when the number of repetitions is set to 2, the unread count may be automatically subtracted after the first type of system message is created and delivered to the corresponding user twice at regular intervals.

In an embodiment, the mention reminder management portion 370 may provide a reminder message to the corresponding user when the detection of a user behavior that satisfies the user behavior condition has failed, even when the user has read a user-designated mention according to the mention type. In this connection, the reminder message may be repeatedly created according to a preset reminder cycle until a user behavior condition is satisfied. When, after the reminder message is provided, the user behavior condition is satisfied due to the behavior of the corresponding user who is the designated target user, the reminder message may no longer be created.

The control portion 390 may control the overall operation of the apparatus 130 for managing a group mention, and manage the control flow or the data flow between the user-designated mention reception portion 310, the unread count calculation portion 330, the unread count processing portion 350, and the mention reminder management portion 370.

Figure 4:
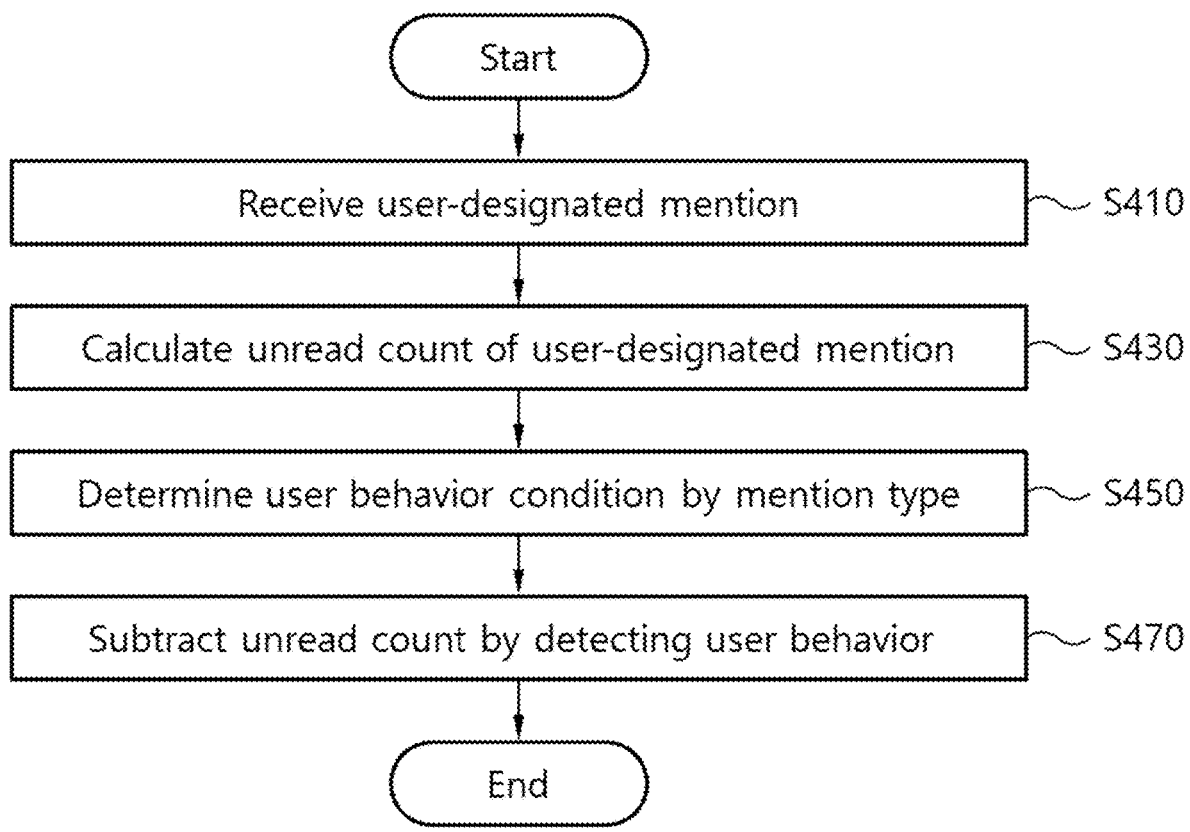
FIG. 4 is a flowchart illustrating a method for managing a group mention based on a user behavior condition according to an embodiment of the present disclosure.

FIG. 4 is a flowchart illustrating a method for managing a group mention based on a user behavior condition according to an embodiment of the present disclosure.

Referring to FIG. 4, the apparatus 130 for managing a group mention may receive, by the user-designated mention reception portion 310, a user-designated mention including a user-designated identifier and user-designated information about one or more users forming a user group (stage S410). The apparatus 130 for managing a group mention may identify the user-designated identifier, distinguish a mention type of the user-designated mention, and calculate an unread count of the user-designated mention that has not yet been read by a corresponding user based on the user-designated information by the unread count calculation portion 330 (stage S430).

The apparatus 130 for managing a group mention may determine, by the unread count processing portion 350, a user behavior condition for subtracting the unread count according to the mention type (stage S450) and determine whether to subtract the unread count by detecting a user behavior associated with the user-designated mention (stage S470).

In an embodiment, when access of the user terminal 110 is sensed, the apparatus 130 for managing a group mention may provide at least one of the number of user-designated mentions or user-undesignated mentions of a corresponding user, the unread counts, and a list of mentions. In addition, the apparatus 130 for managing a group mention may provide the number of user-designated mentions or user-undesignated mentions or the unread counts in the form of a badge. Herein, the badge may correspond to a graphic that visually expresses a numerical value such as a number or an unread count.

Figure 5:
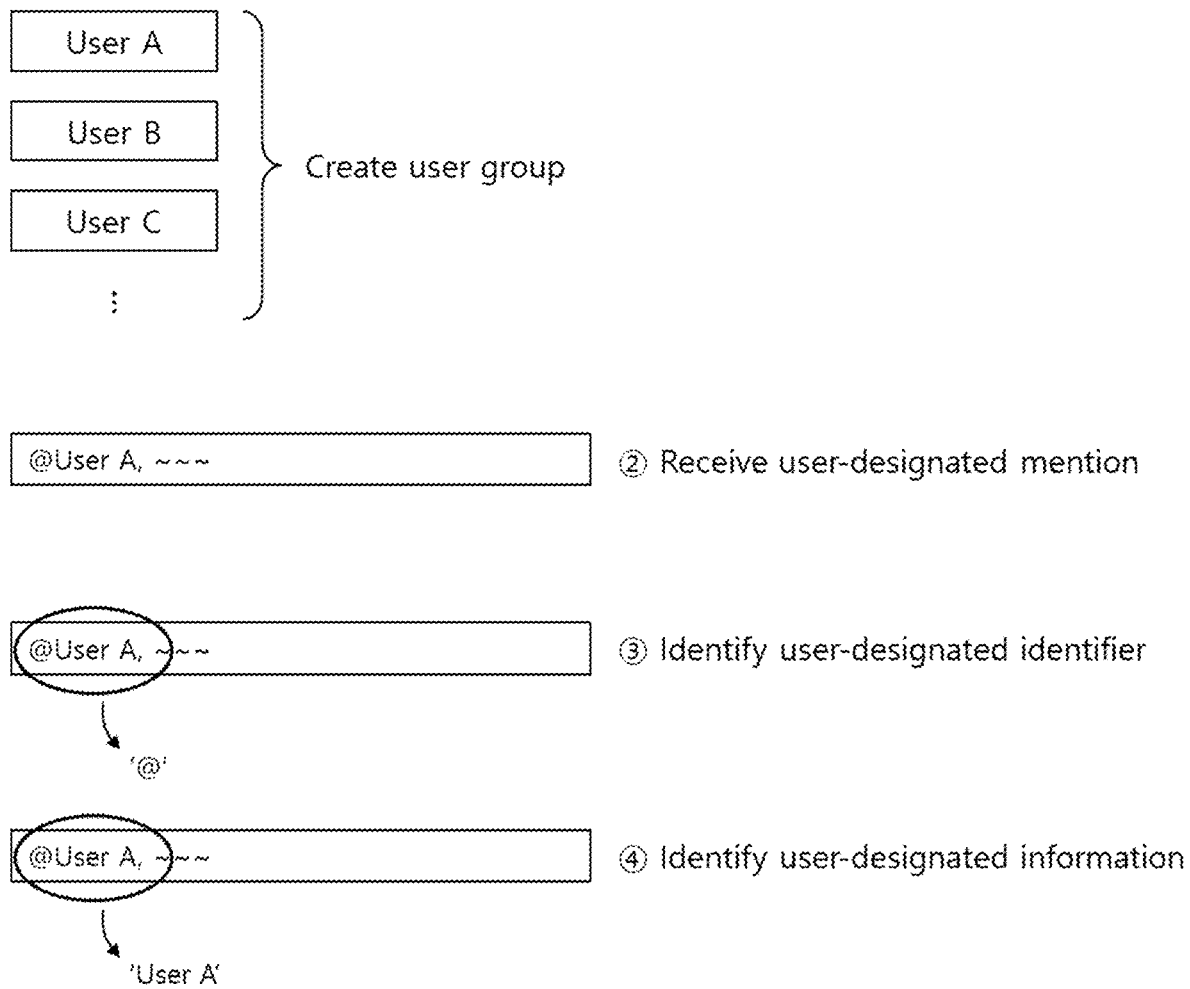

FIGS. 5 and 6 are diagrams illustrating an embodiment of a management process of a group mention according to an embodiment of the present disclosure.

Referring to FIG. 5, the apparatus 130 for managing a group mention may form a user group by receiving user information about one or more users. In other words, the apparatus 130 for managing a group mention may manage a plurality of users by grouping the same into one user group, or may separate and manage a plurality of user groups as needed.

Thereafter, the apparatus 130 for managing a group mention may receive a user-designated mention including a user-designated identifier and user-designated information through the user terminal 110. The user-designated mention may be classified based on whether to include the user-designated information determined by the user-designated identifier. As shown in FIG. 5, when the unit-designated command '@' is used along with identification information of user A, the user-designated mention may apply. In this connection, the identification information of user A may include a name, ID, user identification code, and the like of user A capable of identifying user A.

The apparatus 130 for managing a group mention may identify a user-designated identifier from the user-designated mention, and may perform an operation of identifying user-designated information using the identified user-designated identifier. To this end, the apparatus 130 for managing a group mention may build a user-designated identifier dictionary in advance. Herein, the user-designated identifier dictionary may correspond to a set of user-designated identifiers usable in user-designated mentions. In other words, when a message is received from the user terminal 110, the apparatus 130 for managing a group mention may check whether a user-designated identifier exists in the corresponding message based on the user-designated identifier dictionary.

Referring to FIG. 6, the apparatus 130 for managing a group mention may classify user-designated mentions and user-undesignated mentions using user-designated information. To this end, the apparatus 130 for managing a group mention may build and utilize pre-registered user information as a database. In other words, the apparatus 130 for managing a group mention may compare user information extracted from mentions with user information previously registered in the database, and determine the sameness by distinguishing the same into 'designated' and 'undesignated' based on matching.

In FIG. 6, when user information 'user A' extracted from a mention and previously registered user information 'user A' match, 'user A' may be classified as a user-designated mention. In contrast, in the case of previously registered user information 'user B' or 'user C', 'user B' and 'user C' may be classified as user-undesignated mentions because 'user B' or 'user C' do not match the user information 'User A' extracted from the mention.

As such, the apparatus 130 for managing a group mention may count the number of mentions and the unread counts, respectively, by distinguishing one mention into 'designated' and 'undesignated' for each user. Thus, the apparatus 130 for managing a group mention can independently manage mentions associated with a project or work for each user, and provide a more effective communication function to the user.

Figure 7:
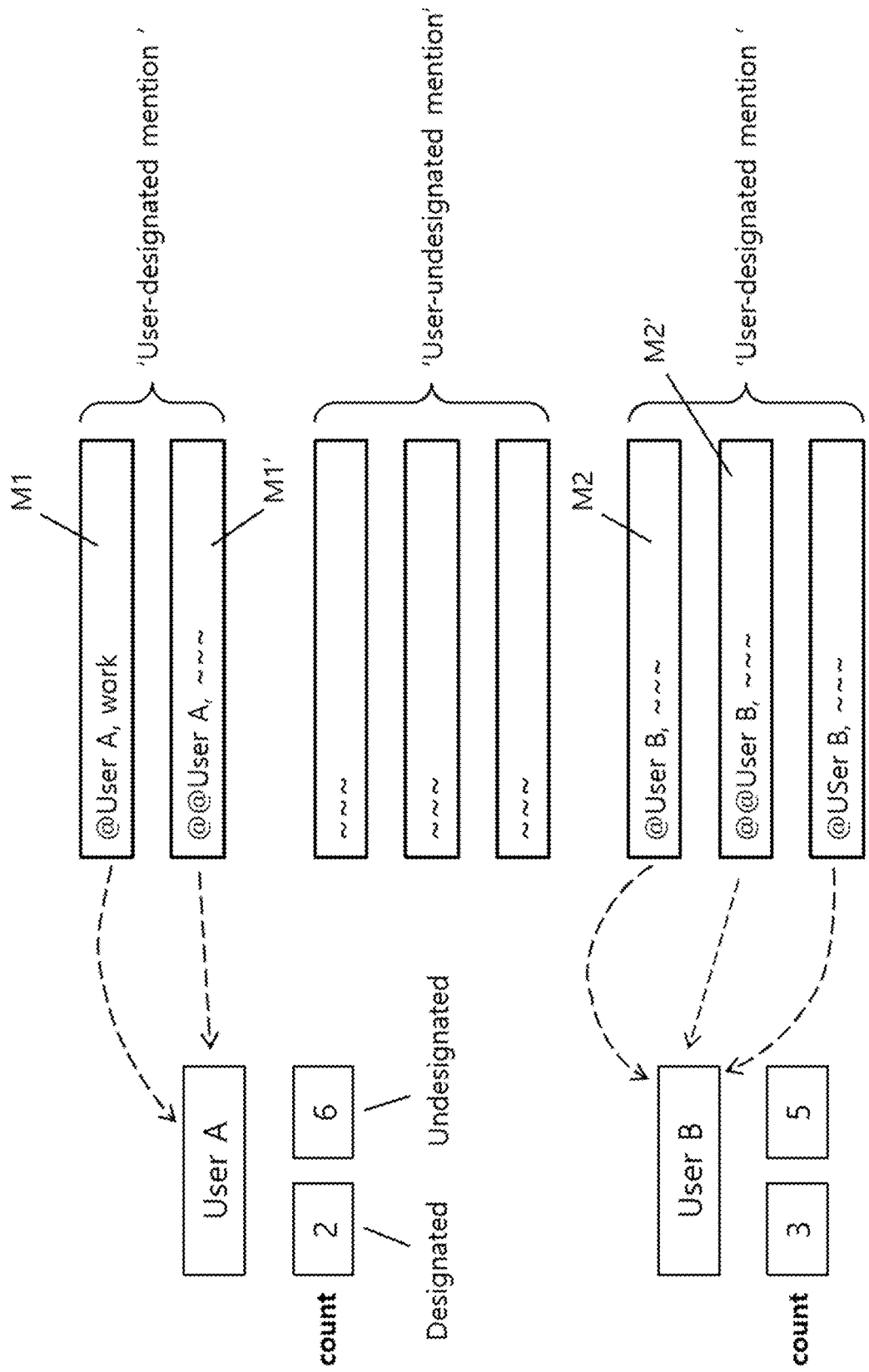
FIG. 7 is a diagram illustrating a user-designated mention and a user-undesignated mention according to an embodiment of the present disclosure.

FIG. 7 is a diagram illustrating a user-designated mention and a user-undesignated mention according to an embodiment of the present disclosure.

Referring to FIG. 7, the apparatus 130 for managing a group mention may provide a chat room associated with a project or work as a way of communication between work participants. In addition, the apparatus 130 for managing a group mention may provide various messages related to projects or work through the chat room.

In this connection, the user-designated mention may correspond to a mention designating a specific user, and in FIG. 7, the special character [@] may be used as a unit-designated command for designating 'user A' or 'user B'. In particular, user-designated mentions may be classified into mention types based on the number of repetitions of the unit-designated command [@].

For example, mention M1 including '@user A' may be determined as the first type as a user-designated mention designating user A as a designated target user, and mention M1' including '@@user A' may be determined as the second type as a user-designated mention designating user A as a designated target user. In addition, mention M2 including '@user B' may correspond to a first type of user-designated mention, and mention M2' including '@@user B' may correspond to a second type of user-designated mention.

Accordingly, mentions including '@user A' and '@@user A' may be classified as user-designated mentions for user A and counted, and mentions including '@user B' and '@@user B' may be classified as user-designated mentions designating user B as a designated target user and counted.

In other words, in FIG. 7, the number of user-designated mentions for user A may correspond to 2, and the number of user-designated mentions for user B may correspond to 3. In this connection, the unread count for each user-designated mention may be counted as 2 and 3, respectively, depending on whether a user behavior condition for each mention type is satisfied for the user-designated mention.

In addition, a user-undesignated mention may correspond to a mention that does not designate a specific user. In other words, the user-undesignated mention may correspond to a mention that does not include user-designated information. However, even in the case of a user-designated mention including user-designated information, it may be classified as a user-undesignated mention to a user other than a designated target user.

For example, in FIG. 7, a user-designated mention for user B may be counted as a user-undesignated mention for user A. Accordingly, the number of user-undesignated mentions for user A may be counted as a total of 6 by adding 3, which is the number of mentions that do not designate a specific user, and 3, which is the number of user-designated mentions that designate user B. In this connection, when the user behavior condition for the behavior of user A is not satisfied with respect to the corresponding user-undesignated mentions, the unread count of the user-undesignated mentions may correspond to 6.

In addition, the number of user-undesignated mentions for user B may be counted as a total of 5 by adding 3, which is the number of mentions that do not designate a specific user, and 2, which is the number of user-designated mentions that designate user A. When the user behavior condition for the behavior of user B is not satisfied with respect to the corresponding user-undesignated mentions, the unread count of the user-undesignated mentions may correspond to 5. When user B reads any one of the two mentions that designate user A, the user behavior condition is deemed to be satisfied, and the unread count of user-undesignated mentions may be subtracted by 1. In other words, the unread count of user-undesignated mentions for user B may correspond to 5-1=4.

Figure 8:
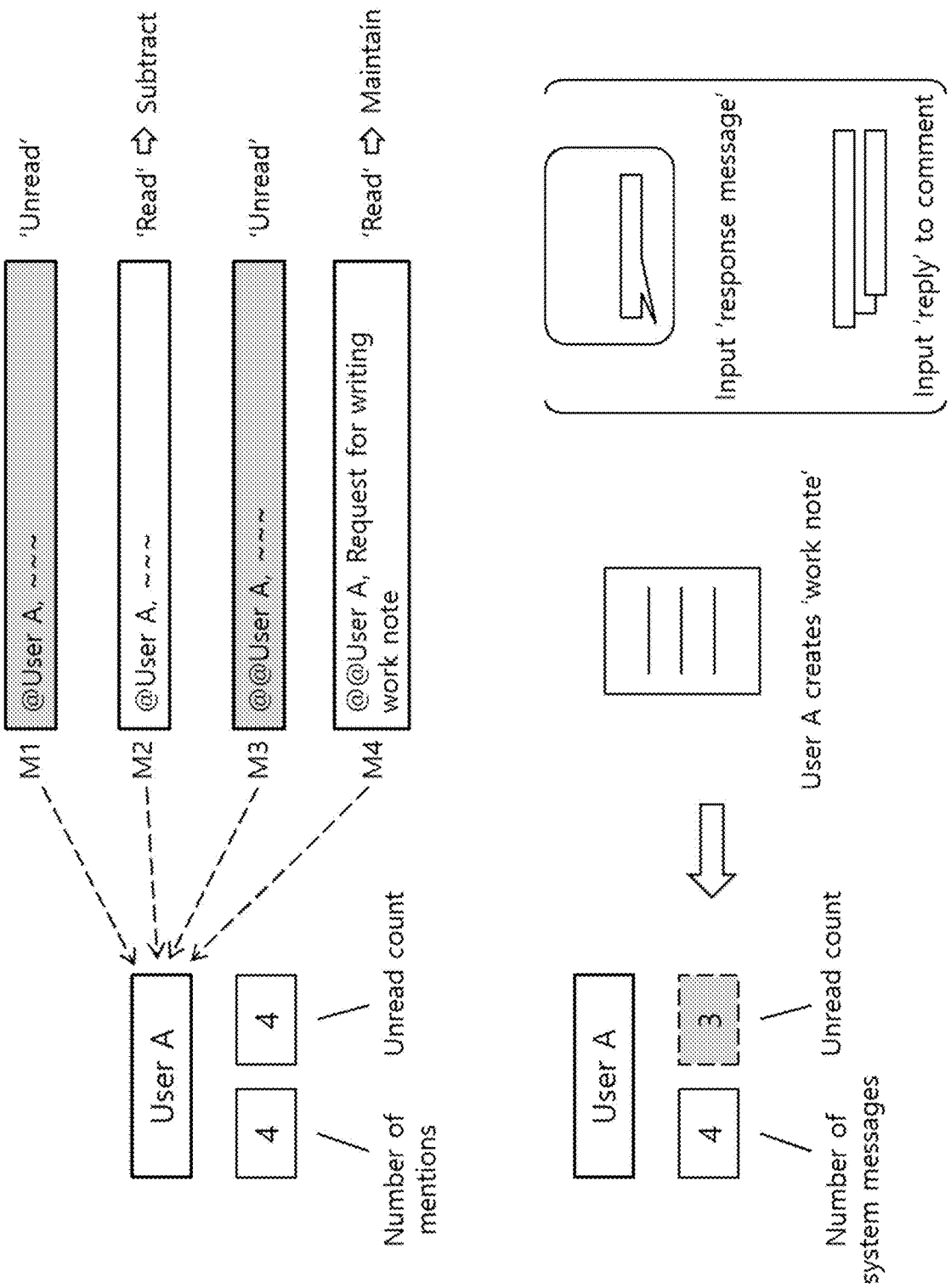
FIG. 8 is a diagram illustrating an embodiment of a process of subtracting the number of unread mentions according to an embodiment of the present disclosure.

FIG. 8 is a diagram illustrating an embodiment of a process of subtracting the number of unread mentions according to an embodiment of the present disclosure.

Referring to FIG. 8, the apparatus 130 for managing a group mention may be implemented to detect a user behavior associated with a user-designated mention and subtract the unread count of the user-designated mention only when the user behavior satisfies a preset user behavior condition. In this connection, the apparatus 130 for managing a group mention may determine the mention type of the user-designated mention and independently assign the user behavior condition for each mention type.

In FIG. 8, when four user-designated mentions M1 to M4 designating user A exist, the number of user-designated mentions for user A may be counted as 4, and the unread count of user-designated mentions may also be counted as 4.

In this connection, in the case where the 2nd user-designated mention M2 and the 4th user-designated mention M4 are read respectively by user A, since M2 is a mention of the first type, the user behavior condition is satisfied by the read behavior of a user, so the unread count may be subtracted (in other words, unread counts=3). In contrast, since M4 is a mention of the second type, the unread count may be maintained as a result of the user behavior condition not being satisfied only by the read behavior of a user (in other words, unread counts=4).

In addition, the apparatus 130 for managing a group mention may create a system message requesting a specific behavior of a user by using a user-designated identifier. For example, the fourth message of FIG. 8 may be created as a second type of system message requesting a specific behavior of 'writing a work note' to user A. In this connection, even when user A checks the corresponding message, the unread count may be maintained without being subtracted. When user A checks the corresponding message and then creates a work note in which work details are recorded, the apparatus 130 for managing a group mention may determine that the user behavior condition is satisfied, and subtract the unread count of the system message for user A by 1. Accordingly, as illustrated in FIG. 8, the unread count of the system message for user A may be changed to 3 as a result of subtracting 1 from 4 and displayed.

In another embodiment, user behavior conditions for subtracting unread counts for user-designated mentions or system messages may include inputting a response message in a chat room and writing a reply to a comment. In other words, when a reply (response message) to a user-designated mention is input by a user in a chat room, the apparatus 130 for managing a group mention may subtract the unread count for the user. In this connection, the chat room may correspond to a general chat room or a note chat room associated with a work note. In addition, when a user writes a reply (response text) to a comment on a plan or task, the apparatus 130 for managing a group mention may subtract the unread count for the corresponding user.

The apparatus 130 for managing a group mention may use the user-designated identifier for work notes, not for user-designated mentions or system messages. Specifically, when a unit-designated command of a user-designated identifier is used in a work note, the type of work note may be determined according to the number of repetitions of the unit-designated command. In other words, when one unit-designated command is used in a work note, the unread count for the work note may be subtracted when a user reads the work note. When the unit-designated command is repeatedly used twice or more, even when the user reads the work note, the unread count may be maintained. In this connection, when the user creates a note chat room in the corresponding work note and inputs a response message in the chat room, the unread count may be subtracted.

Figure 9:
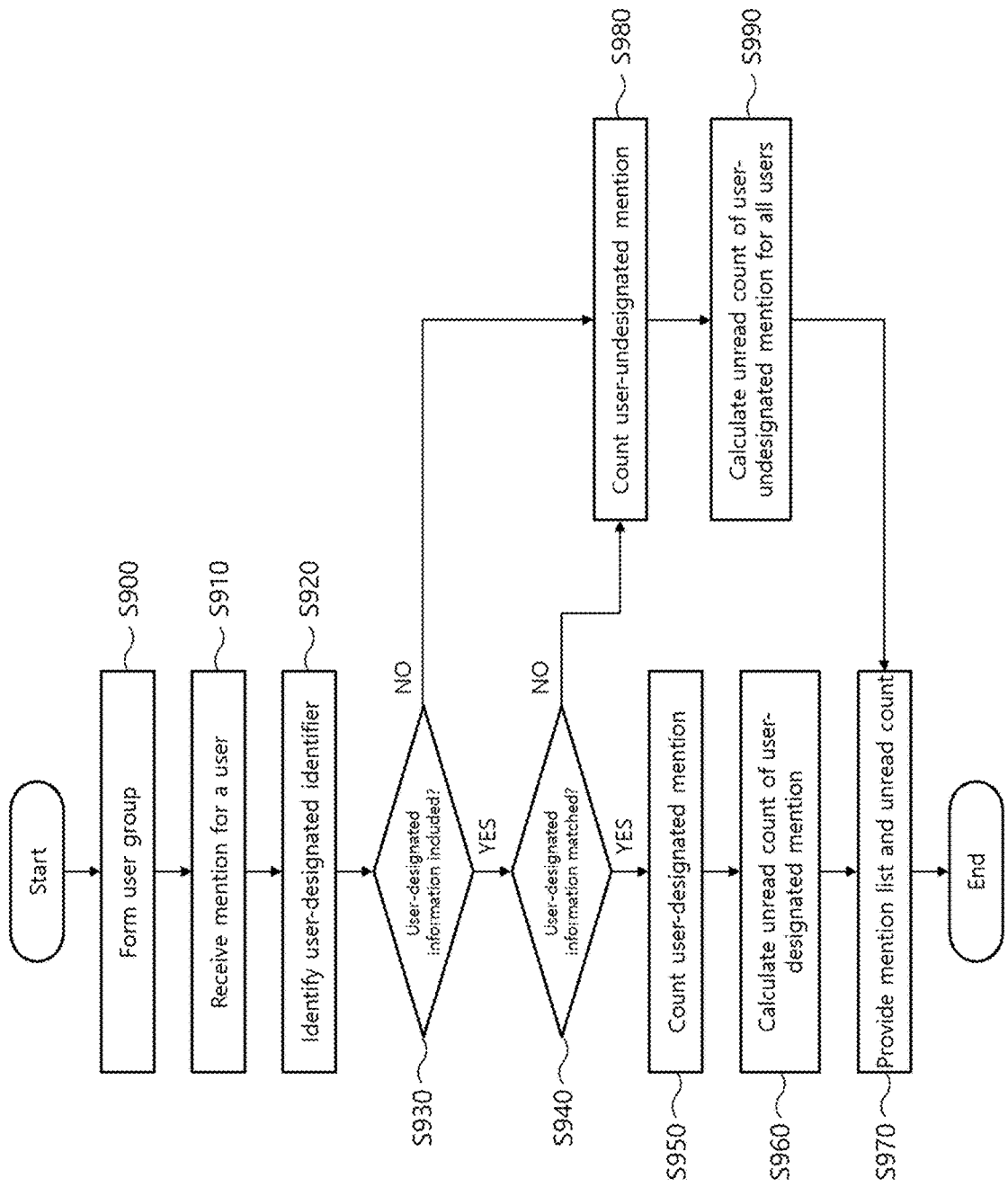
FIG. 9 is a diagram illustrating an embodiment of a method for managing a group mention according to an embodiment of the present disclosure.

FIG. 9 is a diagram illustrating an embodiment of a method for managing a group mention according to an embodiment of the present disclosure.

Referring to FIG. 9, the apparatus 130 for managing a group mention may receive one or more pieces of user information to form a user group (S900). In addition, mentions (or group mentions) may be received from one or more users in the user group (S910).

The apparatus 130 for managing a group mention may identify a user-designated identifier from the received mention (S920). The apparatus 130 for managing a group mention may discriminate whether user-designated information is included using the user-designated identifier (S930), and as a result, when valid user-designated information is included in the mention, the apparatus 130 for managing a group mention may determine whether a matching user exists in the user group through matching with previously registered user-designated information (S940).

When there is a matching user, the apparatus 130 for managing a group mention may count the accumulated number of user-designated mentions for the designated target user (S950). On the other hand, the valid user-designated information may correspond to user-designated information input by a user having a legitimate right to input group mentions using a correct unit-designated command. User-designated mentions input by users without access rights may be invalidated or treated as user-undesignated mentions.

In this connection, the type of user-designated mention may be determined according to the number of repetitions of the unit-designated command. For example, one repetition of a unit-designated command may correspond to a first type of user-designated mention, and two repetitions of a unit-designated command may correspond to a second type of user-designated mention. The apparatus 130 for managing a group mention may define and utilize various mention types according to the number of repetitions of unit-designated commands.

When user-designated information is not validly included in the corresponding mention as a result of determining whether the user-designated information is included in the received mention, the apparatus 130 for managing a group mention may classify the mention as a user-undesignated mention and count the accumulated number (S980). In addition, even in the case where user-designated information is not validly included in the corresponding mention, when matching with previously registered user information fails, the apparatus 130 for managing a group mention may classify the mention as a user-undesignated mention and count the accumulated number (S980). In stage S920, when the identification of the user-designated identifier in the corresponding mention fails, the apparatus 130 for managing a group mention may classify the mention as a user-unspecified mention without determining whether user-designated information is included.

When the input mention is counted as a user-designated mention (S950), the apparatus 130 for managing a group mention may calculate the unread count by adding the unread count of the user-designated mentions for a designated target user to the counted number (S960). In addition, when the input mention is counted as a user-undesignated mention (S980), the apparatus 130 for managing a group mention may add the unread count of the user-undesignated mentions for all users in a group as much as the number of corresponding mentions (S990).

The apparatus 130 for managing a group mention may provide a list of input mentions and an unread count to a corresponding user (S970). For example, when a user access is sensed, the apparatus 130 for managing a group mention may provide at least one of the number of user-designated mentions or user-unspecified mentions, the unread count, and a list to the user terminal 110 of the corresponding user based on user information of the corresponding user. In another embodiment, when a user enters a chat room, the apparatus 130 for managing a group mention may display and provide at least one of the number of user-designated mentions or user-undesignated mentions input in the chat room, the unread count, and a list in the corresponding chat room.

Figure 10:
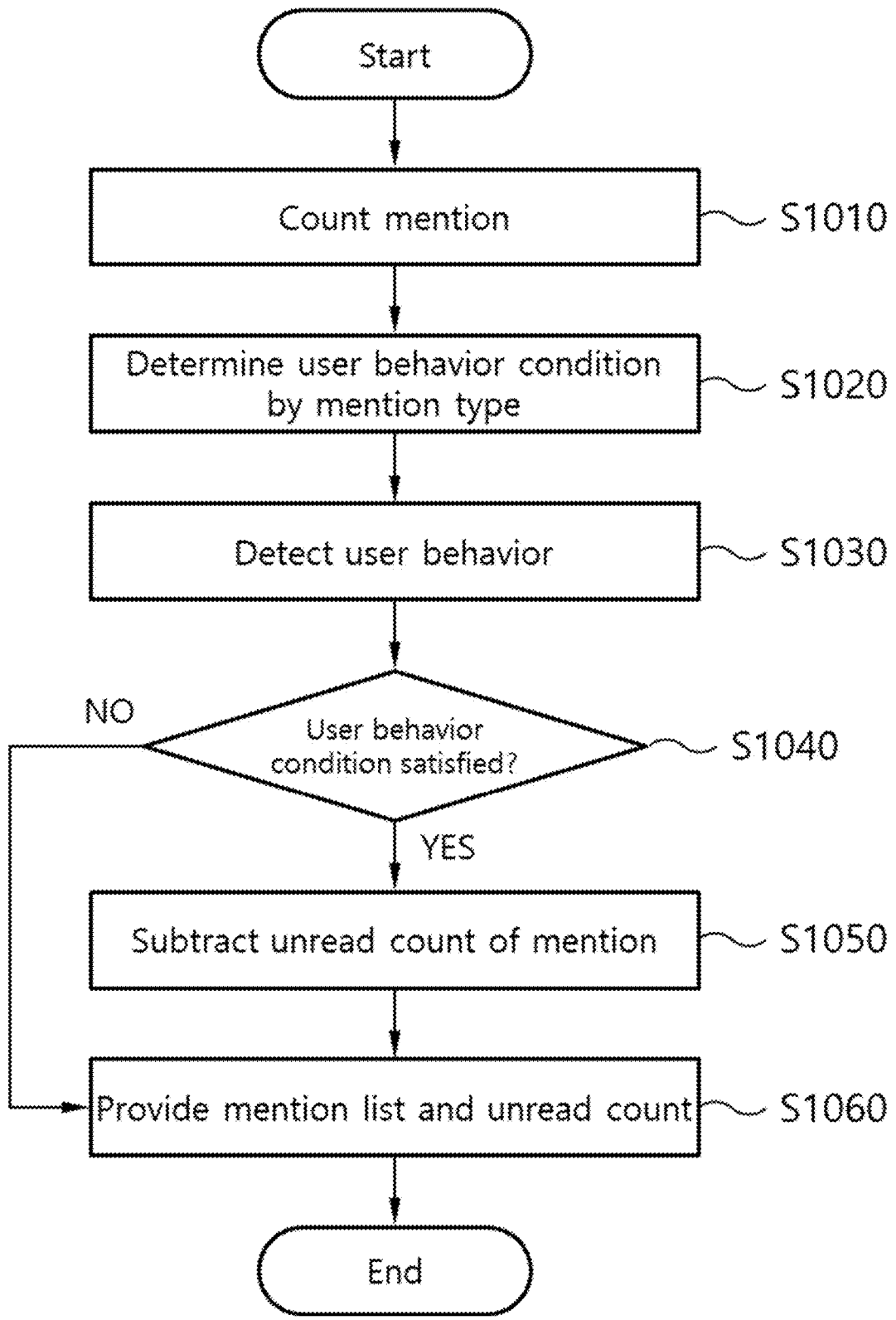
FIG. 10 is a diagram illustrating another embodiment of a method for managing a group mention according to an embodiment of the present disclosure.

FIG. 10 is a diagram illustrating another embodiment of a method for managing a group mention according to an embodiment of the present disclosure.

Referring to FIG. 10, the apparatus 130 for managing a group mention may cumulatively count the number of mentions and the unread count respectively for the mentions input by a user (S1010). The apparatus 130 for managing a group mention may manage mentions per user or user group, and to this end, the type of user-designated mentions may be distinguished and defined.

In particular, the apparatus 130 for managing a group mention may independently determine user behavior conditions for each mention type (S1020). For example, a confirmation behavior of a user for a first type of user-designated mention may be assigned as a user behavior condition, and a confirmation behavior of a user for a second type of user-designated mention and a response message input behavior of a user may both be assigned as user behavior conditions.

Thereafter, the apparatus 130 for managing a group mention may detect a user behavior on the user terminal 110 (S1030). In this connection, the user behavior may include not only a behavior of reading a mention, but also behaviors of inputting a message in a chat room, creating a work note, and inputting a comment on the work note.

The apparatus 130 for managing a group mention may determine whether a user behavior condition is satisfied based on the detected user behavior (S1040). When the user behavior condition is satisfied, the number of unread mentions associated with the corresponding user behavior may be subtracted (S1050). In other words, the apparatus 130 for managing a group mention may maintain the number of unread mentions even when a user checks the content of the corresponding mention according to the satisfaction of the user behavior condition, so that the user behavior assigned to the mention may be performed by the user.

Thereafter, the apparatus 130 for managing a group mention may provide each user with the updated unread count, and, if necessary, create a list of mentions corresponding to a list of mentions associated with the corresponding user and provide the list together with the unread count (S1060).

Although the above has been described with reference to preferred embodiments of the present disclosure, those skilled in the art can variously modify and change the present disclosure within the scope not departing from the spirit and scope of the present disclosure described in the claims below. You will understand that it can be done.

Hereinbefore, although preferred embodiments of the present disclosure have been illustrated and described, it will be appreciated by those skilled in the pertinent technical field that various modifications and variations may be made without departing from the scope and spirit of the present disclosure as described in the claims below.

DESCRIPTION OF REFERENCE NUMERALS

100: System for managing a group mention
110: User terminal
130: Apparatus for managing a group mention
210: Processor
230: Memory
250: User input/output portion
270: Network input/output portion
310: User-designated mention reception portion
330: Unread count calculation portion
350: Unread count processing portion
370: Mention reminder management portion
390: Control portion

What is claimed is:

1. An apparatus for managing a group mention based on a user behavior condition by mention type, the apparatus including:
    a user-designated mention reception portion configured to receive a user-designated mention including a user-designated identifier and user-designated information about one or more users forming a user group;
    an unread count calculation portion configured to identify the user-designated identifier, distinguish the mention type of the user-designated mention to determine a type of the mention type as a first type or a second type, and calculate an unread count of the user-designated mention that has not yet been read by a corresponding user based on the user-designated information, the user behavior condition including a specific behavior required by a system message when the user-designated identifier is used for the system message associated with the user group, the specific behavior being determined as a confirmation behavior of the user based on the mention type being the first type and the specific behavior being determined as a behavior other than the confirmation behavior of the user, including an input behavior of a chat message, based on the mention type being the second type; and
    an unread count processing portion configured to determine the user behavior condition for subtracting the unread count according to the mention type, determine whether to subtract the unread count by detecting a user behavior associated with the user-designated mention,
    wherein the user-designated mention reception portion, the unread count calculation portion, and the unread count processing portion are each implemented via at least one processor.

2. The apparatus of claim 1, wherein the unread count calculation portion is further configured to determine, when the user-designated mention is input, the user-designated information by identifying the user-designated identifier, and determine a designated target user of the user-designated mention by comparing the user-designated information with pre-stored user information.

3. The apparatus of claim 1, wherein the unread count calculation portion is further configured to determine the mention type of the user-designated mention based on a number of repetitions of a unit-designated command configuring the user-designated identifier.

4. The apparatus of claim 1, wherein the unread count processing portion is further configured to maintain the unread count for the corresponding user when failing to detect the user behavior that satisfies the user behavior condition for a predetermined time period based on an input time of the user-designated mention.

5. The apparatus of claim 1, wherein the unread count processing portion includes a behavior of inputting a response message by the corresponding user in a chat room as the user behavior condition when the user-designated mention is input as a conversation message in the chat room in which the one or more users included in the user group participate.

6. The apparatus of claim 1, wherein the unread count processing portion includes each of a behavior of creating a note chat room associated with a work note and a behavior of inputting a response message in the note chat room in the user behavior condition when the user-designated identifier is used for the work note associated with the user group.

7. The apparatus of claim 1, wherein the unread count processing portion is further configured to independently assign the user behavior condition according to the mention type for each strategy map associated with the user group.

8. The apparatus of claim 1, further including: a mention reminder management portion configured to create a reminder message according to a preset reminder cycle for the user-designated mention that has not yet been read by the corresponding user, and transmit the reminder message to the corresponding user, wherein the mention reminder management portion is implemented via at least one processor.

9. The apparatus of claim 8, wherein the mention reminder management portion is further configured to provide the reminder message to the corresponding user when failing to detect the user behavior that satisfies the user behavior condition even when the corresponding user has read the user-designated mention according to the mention type.

10. A method for managing a group mention based on a user behavior condition by mention type, the method including:

receiving a user-designated mention including a user-designated identifier and user-designated information about one or more users forming a user group;

identifying the user-designated identifier, distinguishing the mention type of the user-designated mention to determine a type of the mention type as a first type or a second type, and calculating an unread count of the user-designated mention that has not yet been read by a corresponding user based on the user-designated information, the user behavior condition including a specific behavior required by a system message when the user-designated identifier is used for the system message associated with the user group, the specific behavior being determined as a confirmation behavior of the user based on the mention type being the first type and the specific behavior being determined as a behavior other than the confirmation behavior of the user, including an input behavior of a chat message, based on the mention type being the second type; and determining the user behavior condition for subtracting the unread count according to the mention type, and determining whether to subtract the unread count by detecting a user behavior associated with the user-designated mention.

11. A non-transitory computer-readable medium having embodied thereon a program, which when executed by a computer causes the computer to function as execute a method for managing a group mention based on a user behavior condition by mention type, the method comprising:

receiving a user-designated mention including a user-designated identifier and user-designated information about one or more users forming a user group;

identifying the user-designated identifier, distinguishing the mention type of the user-designated mention to determine a type of the mention type as a first type or a second type, and calculating an unread count of the user-designated mention that has not yet been read by a corresponding user based on the user-designated information, the user behavior condition including a specific behavior required by a system message when the user-designated identifier is used for the system message associated with the user group, the specific behavior being determined as a confirmation behavior of the user based on the mention type being the first type and the specific behavior being determined as a behavior other than the confirmation behavior of the user, including an input behavior of a chat message, based on the mention type being the second type; and determining the user behavior condition for subtracting the unread count according to the mention type, and determining whether to subtract the unread count by detecting a user behavior associated with the user-designated mention.

\* \* \* \* \*